Oct. 18, 1955 — C. W. VOGT — 2,720,737
PRODUCTION AND PACKAGING OF PLASTIC MATERIALS
Filed May 2, 1949 — 2 Sheets-Sheet 1

INVENTOR.
CLARENCE W. VOGT
BY Hubert E. Evans
ATTORNEY.

Oct. 18, 1955    C. W. VOGT    2,720,737
PRODUCTION AND PACKAGING OF PLASTIC MATERIALS
Filed May 2, 1949    2 Sheets-Sheet 2
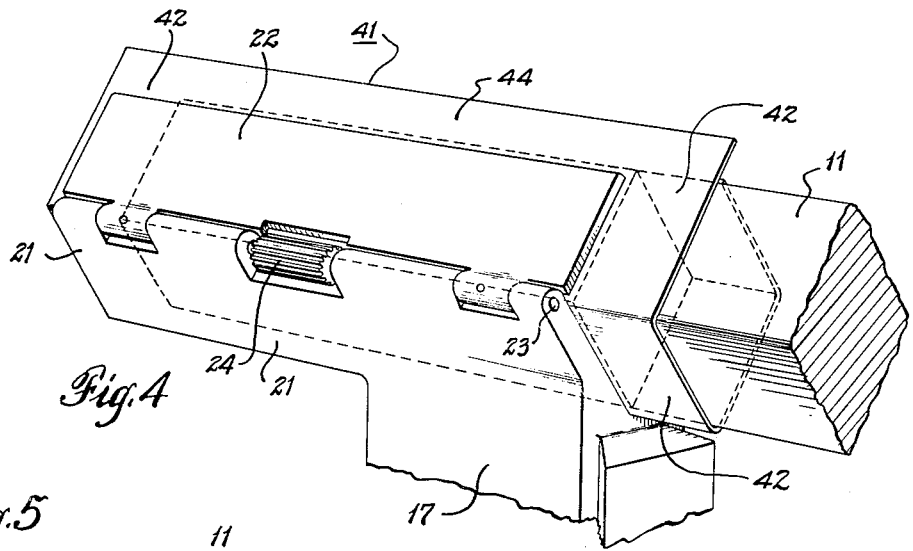
Fig. 4
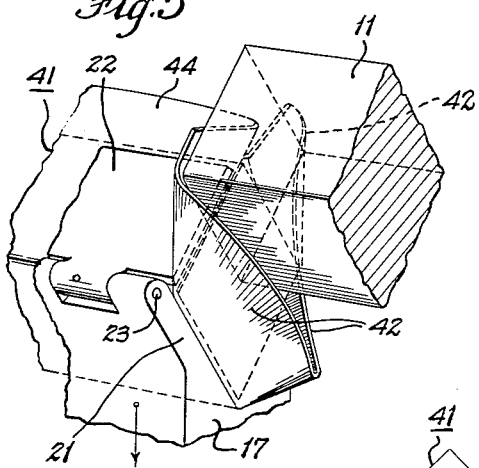
Fig. 5
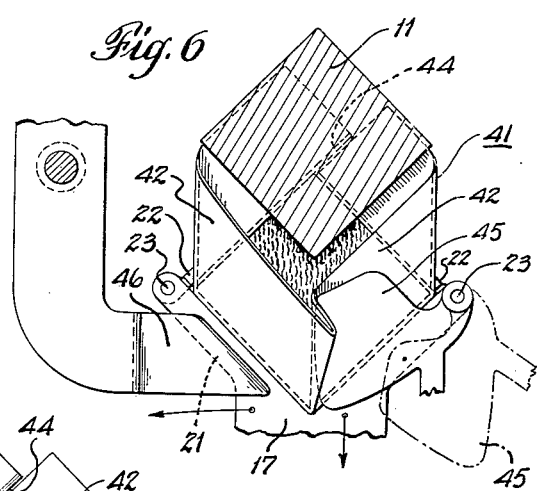
Fig. 6
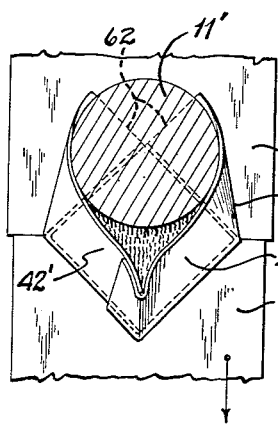
Fig. 9
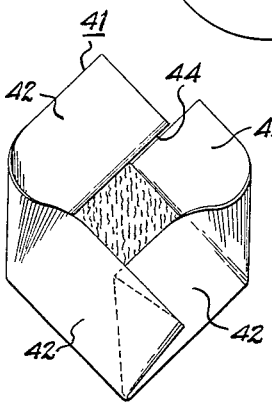
Fig. 7
Fig. 8
INVENTOR.
CLARENCE W. VOGT
BY
Hubert E. Evans
ATTORNEY.

United States Patent Office 2,720,737
Patented Oct. 18, 1955

2,720,737
PRODUCTION AND PACKAGING OF PLASTIC MATERIALS

Clarence W. Vogt, Norwalk, Conn.

Application May 2, 1949, Serial No. 90,852

9 Claims. (Cl. 53—55)

This invention relates to the production of packaged masses of plastic substances and in particular to a method of and apparatus for producing units of plastic material which have been measured and molded to a given size and shape, and which may be packaged as a part of the same operation.

This application is a continuation-in-part of my co-pending applications Serial No. 56,942 filed October 28, 1948 and entitled Wrappers; Serial No. 73,295 filed January 28, 1949 and entitled Chained Enwrapments, now abandoned; Serial No. 83,044 filed March 23, 1949 and entitled Articles for Use in Packaging, now abandoned; and, Serial No. 71,195 filed January 15, 1949 and entitled Method of and Apparatus for Producing Packaged Units of Commodities, now U. S. Patent No. 2,653,430.

It is an object of the present invention to provide a method of and apparatus for producing masses of plastic in which the disposition and shape of the resultant mass and the design and arrangement of the molding means provide greater accuracy in the measurement and formation of the mass. By way of illustration, present day commercial practices for molding individual units or masses of plastic materials such as butter, margarine and the like, involve the use of a molding unit having a mouth opening equivalent to one of the larger cross sectional faces of the molded mass. This is done to reduce the depth of the molding cavity in an endeavor to obtain a completely filled molding cavity so that each mass will approach uniformity and include a constant measured amount. However, present day commercial practices are not successful in that the measured amount of the resulting mass cannot be closely controlled and to avoid the production of packages less than the minimum amount, it is necessary to mold masses which include an excess or tolerance as a safety factor. Contrary to these commercial practices the present invention involves the use of a molding unit or cavity having an opening equal to the smallest cross sectional area of the finished mass and accordingly is of a greater depth. The filling and expelling of the plastic from the molding cavity is accomplished in a direction perpendicular to a plane passing through the smallest cross sectional area of the completed mass.

Another object is to provide a method of and apparatus for producing molded masses of plastic substance which are extruded or molded in a direction perpendicular to a plane passing through the smallest cross sectional area of the mass in which an adjustment for varying the amount of the mass may be effected by varying the smallest cross sectional area of the mass. Generally speaking, it is believed preferable to vary the measured amount of the mass by varying the depth of the molding cavity or unit and obviously if changing the depth of the molding unit varies the smallest cross sectional area of the mass, the adjustment may be more minute and accurate.

Another problem encountered in the molding of plastic substances, most of which have a tendency to adhere to surfaces with which they come in contact, is the problem of removing the molded mass from the molding means without appreciably disturbing the measured amount of the molded mass due to some portion of it adhering to the molding means. It is therefore, a further object of the present invention to provide a method of and apparatus for producing molded masses in which the mass may be severed or removed from the molding means in such a manner that the measured amount of the mass will not vary and the mass will be cleanly removed or separated with little or none of the plastic material adhering to the molding means.

A still further object is to provide a method of and apparatus for producing packaged individual masses of plastic material in which the mass is molded or extruded by a piston member and while in contact with the mass a tubular enwrapment is disposed around the mass with an open end portion of the tubular enwrapment surrounding an end portion of the piston. Then, as the enwrapment and mass are moved with respect to the piston to remove the mass and any plastic tending to adhere to the piston face, the end portions of the tubular enwrapment serve to wipe the piston face so that all of the measured mass may be retained by the tubular enwrapment.

Another object is to provide a method of and apparatus for producing and packaging molded masses of plastic material which may be carried out as a continuous cycle. This is considered an exceedingly valuable feature since the forcing or flowing of plastic through closed conduits on an intermittent basis may create changes in the character and properties of the plastic substance due to the changes in pressure applied to the plastic as its flow is being stopped and started. If continuous flow of the plastic is provided, greater uniformity in the properties of the plastic material will result.

A still further object of the present invention is to provide a method of and apparatus for producing molded plastic masses or units which involve simplified moving mechanisms designed and arranged to provide greater stability of the moving parts. This facilitates the obtaining of uniformly accurate measured masses.

Other objects and advantages will become apparent from the following detailed description accompanied by the drawings in which:

Fig. 4 is an enlarged fragmentary perspective view of a portion of the mechanism shown in Figs. 1 and 2 to illustrate operations in the production of molded masses of plastic;

Fig. 5 is a similar fragmentary perspective view illustrating another operation in the production of a molded mass;

Fig. 6 is an enlarged fragmentary view to show a portion of the packaging operations;

Fig. 7 is a similar view at a point in the cycle after completion of the operations shown in Fig. 6;

Fig. 8 is a fragmentary perspective view of a completed packaged mass of plastic material; and Fig. 9 is a fragmentary view to illustrate a slightly modified form of the present invention.

The present invention deals with the production and packaging of units or masses of a plastic substance or materials. For the purposes of this description the term "plastic substance" or "plastic material" means a semi-plastic or plastic or partially set or solidified substance which under the conditions at the time it is being acted on may be formed or molded or extruded by the use of relatively low pressures. Such materials may be flowed or forced through relatively small conduits or passages by the application of pressure. However, such materials will generally not flow under the influence of gravity to an appreciable extent. Examples of plastic materials to which the present invention may be applied are butter, margarine, lard, partially or frozen confections such as ice cream, etc., and many other materials whether edible or not having the capacity of being flowable or moldable.

In carrying out the present invention the general sequence of operations includes the filling of one or more molding cavities and the extruding or expelling of the plastic from the cavity to provide a mass or unit. Since many plastic materials of the type referred to adhere to the extruding or expelling means it is desirable to provide a clean separation or removal of the mass from the expelling means so that each mass may represent a definite and uniform accurately measured quantity. At the same time it is desirable to package the resultant mass and if this is done by disposing a tubular enwrapment around the mass with the end portions of the tubular enwrapment surrounding the face of the extruding or expelling means, the removal of the mass may be accomplished in conjunction with the removal of the extruding means from the open tubular end of the enwrapment.

Figure 1:
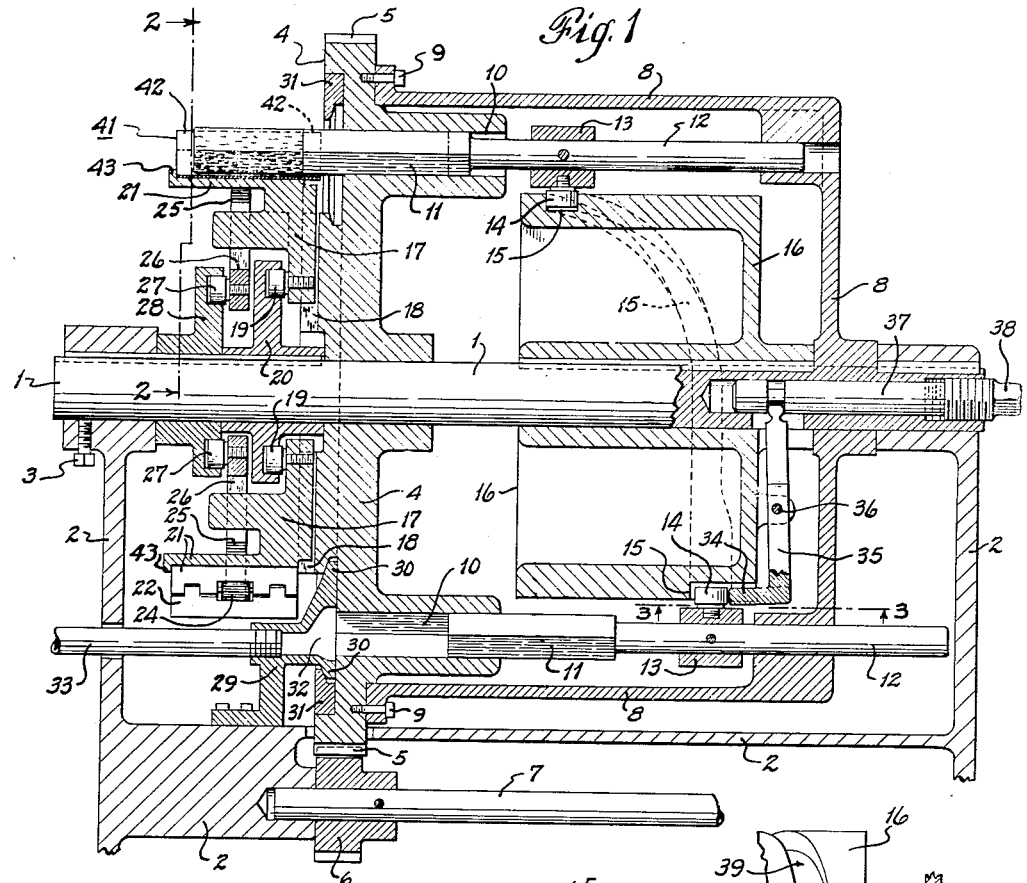
Figure 1 is a fragmentary sectional view of a mechanism illustrated in somewhat diagrammatic form and embodying the present invention.
Figures 2, 3:
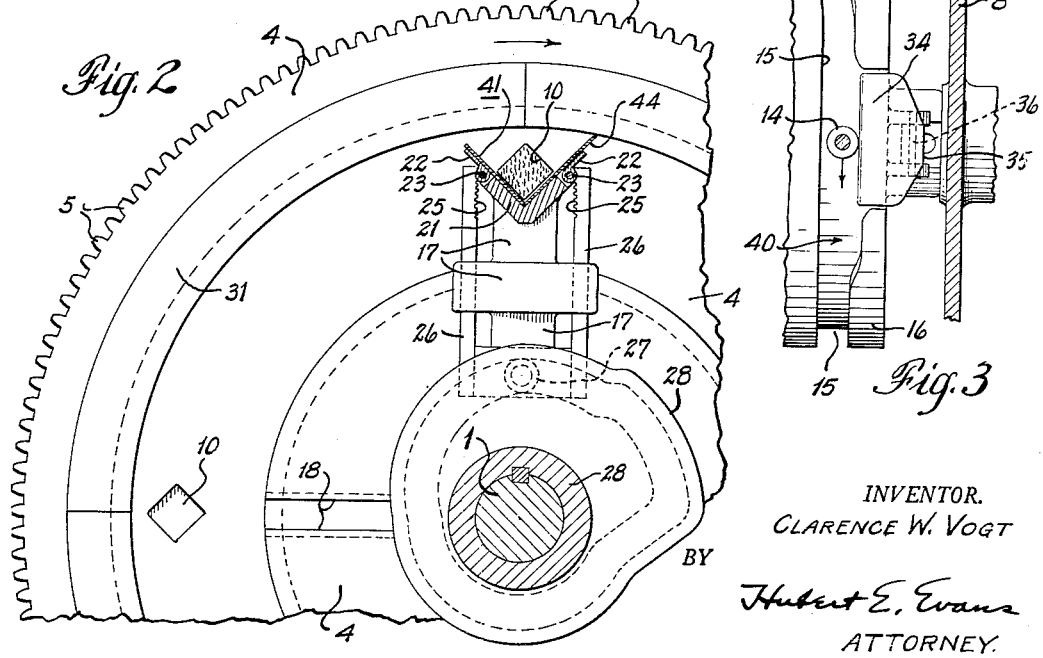
Fig. 2 is an enlarged fragmentary sectional view taken substantially on line 2—2 of Figure 1 showing details of the mechanism and operation thereof.
Fig. 3 is an enlarged fragmentary sectional view taken substantially on line 3—3 of Figure 1.

Figs. 1 and 2 of the drawings illustrate the general arrangement of a preferred form of mechanism which has been shown in a simplified form to illustrate the principles of the present invention. The numeral 1 indicates a stationary shaft supported near its ends in a suitable frame or base 2. The shaft may be held against rotation by a set screw 3 threadedly engaged through a portion of the frame and bearing against the shaft. A rotary member 4 may be mounted for rotation with respect to the shaft and its outer periphery may comprise a ring gear having gear teeth 5 which may engage teeth of a driving pinion 6. The pinion 6 may be secured to a driving shaft 7 journaled in the frame or base 2 (see Figure 1), and driven by any suitable source of power (not shown). A housing or drum-like member 8 may be secured such as by bolts 9 to the rear face of the rotary member 4. The housing and the member 4 rotate together on the shaft 1 and comprise a rotor or drum. One or more cavities or molding units 10 may be provided in extensions of the member 4 opening to an end face of the member 4. These molding units may be of any desired cross section such as, round, square, rectangular, triangular, etc.

As shown in the drawings the cavities are square in cross section and mounted within each molding unit is a piston member 11. Each of the pistons has an integral piston rod 12 which extends axially and may be journaled in the housing 8. To actuate the pistons each of the piston rods may be provided with a sleeve 13 secured to the piston rod. Each of the sleeve members 13 carries a roller follower 14 for engagement in a cam track 15 which cam track is formed in a stationary cam member 16 carried by the stationary shaft 1 and keyed thereto. As the rotary member 4 and housing 8 rotate about the shaft, the curvature of the cam track 15 through the follower 14, the sleeve member 13, and the piston rod 12, causes the piston to move slideably within the molding unit or cavity 10.

Mounted adjacent the face of the rotary member 4 from which the molding cavity 10 opens is a support member 17. To provide accurate sliding movement along the face of the rotary member 4, the support member 17 may be mounted in a slideway or dovetail track indicated by the numeral 18 in Figure 1. The support member 17 is provided with a roller follower 19 which rides in a cam track formed in a stationary cam member 20 mounted on and keyed to the shaft 1. The support member 17 is also provided with a V-shaped or trough-like extension 21 which forms a jaw or support adapted to receive a molded or extruded measured amount of plastic material. At each of the free ends of the V-shaped jaw member 21 there may be pivotally mounted flaps or oscillating members 22. These members 22 are connected to pivot pins 23 (see Figs. 2 and 4) and the pivot pins are journaled in portions of the V-shaped members 21. Each of the pivot pins 23 also has secured thereto a pinion 24. To actuate the pivot pins 23 and the members 22, the pinions 24 mesh with teeth carried by racks 25. These racks constitute the free arm portions of a yoke 26 which is mounted for sliding movement in an extension of the support member 17 as best shown in Figs. 1 and 2. The yoke 26 carries a roller follower 27 which is received in a cam track formed in a stationary cylindrical cam 28 keyed to the stationary shaft 1 adjacent the stationary cam 20. As the rotary member 4 revolves around the stationary shaft 1 the cam 20 actuates the roller follower 19 and moves the support member 17 inwardly and outwardly in a radial direction with respect to the shaft 1 along the face of the rotary member 4 as may be desired. Simultaneously the cam 28 actuates the roller follower 27 to move the yoke 26 in a direction parallel with the direction of motion of the support member 17. At various times during rotation of the rotary member 4 the yoke member will move simultaneously with the support member 17 but at other times it may have a different motion and when it moves with respect to the support member 17 the racks 25 on the free arms of the yoke 26 mesh with the pinions 24 to cause the desired oscillation of the members 22.

To fill the molding cavity or unit 10 in the rotary member, a suitable manifold or filler shoe may be mounted adjacent the rotary member 4 at a suitable location. In Figure 1 the numeral 29 indicates the manifold which is illustrated as being mounted to the stationary frame 2. To adjustably hold the face of the manifold 29 against the face of the rotary member 4 with the desired pressure to prevent undue leakage during the movement of these parts with respect to each other, the manifold may be provided with tapered flange portions 30 along its marginal edges. Inwardly of the molding cavity the tapered flange 30 may be disposed in a groove or track formed in the rotary member 4. Outwardly of the molding cavity the tapered flange portion is held in place by a removable ring member 31 which is preferably split into appropriate segments to facilitate removal of the manifold when desired for cleaning or other purposes. These removable segments of the ring member 31 may be held to the rotary member 4 in any suitable manner such as by bolts (not shown). It is also desirable to design and construct the removable ring 31 so that it may be adjusted in a radial direction with respect to the stationary shaft 1 and as may be seen in the lower portion of Figure 1 this will vary the degree of tightness with which the manifold 29 is held against the face of the rotary member 4. This adjustment is important to provide a variation in the pressure with which the manifold is held to the rotary member to take up looseness which might occur due to wear of the manifold and to facilitate the handling of different types of material on the apparatus.

The manifold 29 is provided with a central aperture 32 therethrough which aperture is in register with the path of the molding cavity. The manifold may be connected to any suitable source of supply which will flow or force the material through a suitable conduit. For example, a gear pump, a helical screw, a piston pump, or other suitable mechanism may flow the plastic to a conduit or infeed pipe indicated by the numeral 33 in Figure 1 which may be secured to the manifold in register with the aperture 32.

Alternatively the conduit 33 might be supplied with material directly from a continuous process apparatus capable of producing the plastic material. This is believed to be especially advantageous since the apparatus shown in the drawings may be designed to accommodate the full production of the material and in effect supplements the continuous processing from manufacture of the material until it is formed and packaged into measured units. With a number of materials, the consistency of which may vary, it is believed desirable to maintain the material in motion to avoid affecting the consistency. According to the present invention the mechanism may be designed and constructed so that material is continuously moving through the conduit and the manifold and into the molding units or cavities in the rotary member 4.

It will also be obvious that the manifold may be of any desired arcuate extent and may even be a multiple manifold so that each molding cavity may receive partial charges of the same or different material from each station of the multiple manifold. Such an arrangement would be particularly beneficial, for example, in the production of a composite confection such as multi-flavored ice cream or the like.

As described, the cam 16 through the action of its cam track 15 on the roller follower 14 moves the pistons 11 within the molding units 10. Thus as each molding unit passes under the manifold the piston mounted therein may be positioned to completely close the molding cavity. That is, the face of the piston is flush with the face of the rotary member 4. As the pressure of the material passing through the aperture 32 of the manifold from the supply line 33 tends to force material into the molding cavity, the piston may be withdrawn or retracted into the molding cavity and the simultaneous action of the pressure on the material and the withdrawing of the piston will cause a complete filling of the molding cavity with the material. The filling in accordance with the present invention obviates the displacement of air from the molding cavity which is a problem in the present day commercial mechanisms.

The size and shape of the molding cavity and the piston, and the length of stroke of the piston as influenced by the shape of the cam track 15 of the cam 16, control the measured amount of material produced in each unit. However, it is generally considered desirable to provide for an adjustment in this measured amount to take care of variations in the characteristics of the material. For example, in the production of unit masses of margarine or butter, weather conditions and the permissible degree of control of the manufacturing conditions result in variations in the properties of the product, such as, density, percentage of entrained air, and the like. In order to maintain a constant weight for a unit mass it is necessary to be able to adjust the volume of the molding cavity. This may be done by providing an adjustable portion of the cam track 15 at a point where the molding cavity is beneath the manifold and being filled. Figs. 1 and 3 illustrate a mechanism to accomplish the desired result. That section of the rear wall of the cam track against which the roller follower 14 will abut when the piston is at its rearward point of travel and the molding cavity reaches its point of largest opening, may be cut away to permit insertion of a movable cam track section 34. The movable section 34 may be actuated for adjustment in any suitable manner.

Figure 1 illustrates the section 34 as comprising an extension or foot of a lever 35 which lever is pivotally mounted between its ends to a portion of the cam member 16 at the location indicated by the numeral 36. The opposite end of the lever 35 may be provided with a rounded portion engaged in a reduced section of an adjusting pin 37 threadedly mounted in an end of the stationary shaft 1. The adjusting pin 37 may be provided with flat lands 38 suitable for accommodating a wrench, or a hand wheel, or other desired regulating mechanism. As the adjusting pin is rotated it engages the rounded end portion of the lever 35 pivoting it about the pivot point 36 to move the section 34 of the cam track to vary the inward limit of the travel of the piston 11. As the rotary member 4 and housing 8 revolve, the roller follower 14 under the influence of the cam track 15, retracts the piston 11 when the molding cavity and piston are under the manifold. A portion of the cam track 15 curved to cause this movement is indicated by the numeral 39 in Fig. 3. As the piston reaches its innermost position illustrated in full lines in the bottom of Figure 1, the roller follower 14 engages the movable section 34 of the cam track which defines this inward position.

At this point the pressure which acts to force the plastic material through the manifold and into the molding cavity reacting through the piston, causes the follower 14 to engage the section 34 although the cam track be widened at this point. Further rotation of the rotary member 4 moves the follower 14 off of the section 34 and substantially simultaneously therewith the molding cavity passes from its area of register with the aperture 32 of the manifold 29. At this time the molding cavity then passes under the sealing face or marginal edge portion of the manifold which is closely adjacent the face of the rotary member. Since at this point the molding cavity is no longer able to receive material from the manifold the measured amount of plastic material has been established.

Where the plastic material has internal pressure due to factors such as entrained air, there may still be a pressure on the measured amount of plastic and if the molding cavity were to leave the marginal edge of the manifold the first portion of the plastic to be exposed might tend to expand and give an uneven surface at the opening of the molding cavity. To obviate this, the cam track 15 may be widened for an appreciable distance beginning with the movable section 34 and extending for a considerable distance. This widened portion is indicated by the numeral 40 in Fig. 3. If the plastic material has any internal pressure, and since the front surface of the molding cavity is covered by the marginal edge of the manifold, this internal pressure will cause the piston 11 and the follower 14 to retract, which is permissible due to the widened portion 40 of the cam track 15.

At a suitable point in the rotary cycle of the member 4 the cam track 15 influences the follower 14 causing movement of the piston 11 in a direction so as to expel the measured amount of plastic from the molding cavity 10. Prior to the beginning of the expelling or depositing of the plastic material, a suitable enwrapment indicated by the numeral 41 may be disposed in the V-shaped jaw portion 21 of the support member 17. As shown in the drawings the enwrapment may be a V-shaped folded section of sheet material and is placed so that the apex of the enwrapment is aligned with the apex of the jaw member 21. Enwrapments of this general type are described and claimed in my copending application Serial No. 83,044 filed March 23, 1949, and when utilized in connection with a mass which is rectangular or square in cross section, each side of the V is of sufficient extent to correspond with two side panels of the mass. One of the sides of the V may extend for an additional distance sufficient to provide an overlap when the enwrapment is disposed in a tubular configuration surrounding the mass. The enwrapment is also preferably of greater longitudinal extent than the mass so that when the mass is positioned on the enwrapment the end portions of the enwrapment indicated by the numeral 42 in Figs. 1 and 4, are available for making suitable end folds to enclose the ends of the mass.

At this time the support member 17 may be moved outwardly by the cam 20 with the cam 28 moving the yoke member so that there is no relative motion between the yoke 26 and the support member 17. In this position the members 22 are aligned with the faces of the V-shaped jaw member to which they are pivotally attached as illustrated in Fig. 2. As the piston 11 expresses the unit or mass of plastic material outwardly from the molding cavity the support member 17 and the enwrapment 41 move radially outward from the shaft 1 to receive the same. Preferably the outward movement of the piston and the radial movement of the V-shaped jaw are timed so that the apex of the jaw become aligned with the bottom of the mass being expelled as the mass reaches its outermost position, which position is illustrated at the top portion of Figure 1.

To prevent the possibility of the mass being expelled wrinkling or disturbing the position of the enwrapment in its position on the V-shaped jaw 21, it is believed preferable to provide any suitable gripper members (not shown) to contact the enwrapment and hold it in position against the members 22 and the V-shaped jaw 21. Alternatively, the V-shaped jaw 21 may be provided with vacuum ports so that the enwrapment may be firmly held to the jaw by air pressure. In the drawings, the only gripping means shown comprises an upturned flange or lip 43 on the V-shaped jaw 21 to engage the outer portion of the apex of the enwrapment. If the enwrapment is made from a sheet material having some rigidity, as might be true with a relatively heavy kraft paper, or a metal foil enwrapment, the lip or flange 43 may be sufficient to hold the enwrapment against movement. It should be pointed out that the folding or creasing of the enwrapment increases the rigidity and stability thereof over and above that possessed by the same sheet material in an unfolded state.

From the drawings it may be noted that the arrangement and shape of the molding cavity and associated parts is such that the filling and expelling of the mass are accomplished in a direction which is perpendicular to a plane passing through the smallest cross section of the mass. This means that any irregularity or inaccuracy in the direction of the expelling of the mass will modify the smallest dimension of the mass. Similarly, the adjustment due to the movable section 34 of the cam track 15 may be more accurately made and controlled since it also affects the smallest cross section of the mass.

In connection with the adjustment of the measured amount of the mass, it may be seen that the cam track 15 will always bring the leading face of the piston outwardly from the molding unit to the same position. This means that the adjustment in the length of the mass will always occur at the outer end of the mass and will merely affect the extent of the end portions 42 of the enwrapment at this outer end. However, the greater accuracy of the mass obtained by the present invention will make this fact of much less importance than is presently true of the molding of units or masses of plastic materials in accordance with present day commercial practices.

With the mass completely expelled from the molding cavity and supported in position on the enwrapment and the V-shaped jaw 21, it is only necessary to dispose the enwrapment to a tubular configuration surrounding the mass, to remove it from the forming piston to which it may adhere, and to make suitable end folds from the end portions 42 of the enwrapment to enclose and completely package the individual mass. The disposing of the enwrapment to tubular configuration surrounding the mass may be readily accomplished by the members 22. The yoke 26 under the influence of the cam 28 moves radially outwardly with respect to the stationary shaft 1 and with respect to the support member 17. This causes the rack members 25 meshing with the pinions 24 to pivot the members 22 from the position shown in Fig. 2 to the position shown in Fig. 4 where they cause the free ends of the V-shaped enwrapment to enclose the mass. In this position a marginal edge of the enwrapment 44 which is on the longer side of the two sides of the V, and is to become the overlapped portion of the enwrapment, extends outwardly from between the members 22. The inner end portions 42 of the enwrapment when it has been closed to a tubular configuration encircle an end portion of the piston 11 which is still in contact with the mass of plastic (see Fig. 4).

When the enwrapment has been disposed in tubular configuration the support member 17 together with the yoke member 26 due to the similar curvatures of the cam members 20 and 28 may commence to move radially inwardly. Since the end face of the piston 11 is closely adjacent the inner end of the V-shaped jaw member 21 and the inner ends of the members 22, movement of the support member with respect to the piston effects the exiting of the piston member from the end portion of the tubular enwrapment through the axially extending opening in the end portion of the tubular enwrapment between the two marginal edges thereof as may best be seen in Fig. 5.

The closely controlled accurate radial movement of the support member 17 since it is mounted on the face of the rotary member 4 creates an excellent and substantially complete separation or removal of the plastic mass from the face of the piston to which it tends to adhere. It is believed that this is due to the fact that plastic materials of this type generally have greater cohesion than they do adhesion to the piston face, which is of a different material. At the same time, if any of the plastic material is not removed with the mass from the face of the piston the end portions of the tubular enwrapment in the region of the marginal edges thereof will be distorted by the action of the piston so as to form flat areas which engage all portions of the piston face and serve to wipe plastic material therefrom (see particularly Figs. 5, 6, and 7).

The deformation of the end portions of the enwrapment by the piston in exiting from the end of the tubular enwrapment also causes a raising of the end portion of the apex of the enwrapment which may be clearly seen in Fig. 5. The raising of the end portion of the apex of the enwrapment facilitates the formation of certain of the end folds for the enwrapment at the end of the mass facing the piston. Accordingly it is believed desirable to perform these end folds while the piston is being exited and causing the beneficial deformation of the enwrapment. For example, Fig. 6 shows a movable folder 45 pivotally mounted on one of the pivot pins 23 to which the members 22 are also pivotally mounted. This folder 45 may be actuated by any suitable mechanism (not shown) to move from its dotted outline position in Fig. 6 to its full line position to accomplish the lower rearward end fold for the package. At the same time the corresponding end fold at the opposite end of the package may be formed by a similar folder which may be actuated by the same mechanism which causes movement of the folder 45. As soon as the folder 45 has performed its function the movement of the rotary member 4 will cause the support member 17 to move past stationary folding members 46 which effect the forward lower end folds for the package at both ends thereof. The folders 46 may be supported in any desired manner from a portion of the frame of the machine. Fig. 7 illustrates the position of the enwrapment as soon as the end folds performed by the mechanism shown in Fig. 6 have been completed. The balance of the end folds may be accomplished in any suitable manner and mechanism for carrying this out has not been illustrated since the formation of such end folds is conventional in the packaging field. Prior to the formation of the end folds the upwardly bent portions 42 of the enwrapment adjacent the marginal edges may preferably be straightened out by suitable forming members after the piston has been exited therefrom due to the inward radial movement of the support member 17. Fig. 8 illustrates a completed end portion of a package after the formation of all of the folds.

Fig. 9 illustrates a slightly modified form of the invention. In this view the forming piston 11' is shown as a cylindrical piston which may be mounted for reciprocation in a hollow tubular cylindrical molding unit. When the cylindrical molding unit has been filled with plastic material in a manner similar to that described in connection with the piston 11 and the molding unit 10, both the piston and the tubular molding unit may be advanced to extend beyond the end face of a rotary member which may be similar to the rotary member 4. At this point an enwrapment 41' may be disposed around the hollow cylindrical molding unit to a closed tubular configuration. Then by suitably gripping the tubular enwrapment the hollow cylindrical molding unit may be retracted into the end face of the rotary member while holding the piston in contact with the formed mass of plastic. This deposits the mass within the tubular enwrapment and since the mass was deposited from a cylindrical tube it will be cylindrical and of a smaller diameter than the tubular enwrapment. However, suitable forming members 60 and 61 may contact the tubular enwrapment and enclosed plastic mass to shape the same from a circular cross section to a square or rectangular cross section. This will cause the plastic mass to fill out the tubular enwrapment since for the same cross sectional area, a square or rectangle will have greater perimeter than a circle. It has been found that the shaping of a plastic mass of this character can be accomplished without appreciable endwise extrusion of the plastic.

To accomplish the wiping action and exiting of the piston from the end portion 42' of the tubular enwrapment 41' it is only necessary to move the forming members 60 and 61 with respect to the piston 11' in a direction parallel with the end face of the piston and the piston may be exited through an axially extending opening 62 in the end portion 42' of the enwrapment. This axially extending opening 62 may comprise a slit formed at the desired location in the end portion 42' of the enwrapment.

The completed package produced in accordance with the present invention comprises a measured amount of plastic which may be completely enclosed in an enwrapment of a suitable sheet material. If the character of the commodity makes it desirable to protectively enclose it, the overlap portion of the enwrapment (indicated by the numeral 44 in Figs. 1 through 8) may be secured or adhered to the opposite marginal edge of the enwrapment by providing either a continuous or discontinuous adhesive area along one or both of the overlapped portions.

The particular adhesive may be selected in accordance with the plastic material to be enwrapped and in accordance with the nature of the package which it is desired to produce. For example, the adhesive may be of the pressure sensitive type, or may be a thermoplastic, or may be a water soluble gum type, or may be activatable by some other solvent. A thermoplastic adhesive is considered desirable since such adhesives are readily reactivatable and thus the same adhesive may be utilized in packaging as was previously used to secure the individual enwrapments into a chain or series. When it is desired to protectively enclose a plastic mass, an individual enwrapment may be detached and positioned in the support member to receive a formed mass. The adhesive substance may then be activated to secure the overlapped portions of the enwrapment together. If the mass of plastic may be adversely affected by the presence of heat necessary to activate the adhesive it is contemplated that an adhesive of the type known as "delayed action" may be utilized to advantage. Such an adhesive derives its name from the fact that it will remain tacky for an appreciable time period after it has been activated even though it may have cooled to a temperature below its activation point.

While the drawings illustrate enwrapments which have been formed to provide an overlap or longitudinal seam, it is also contemplated that other types of seams may be made in producing a completed package. The enwrapment may be dimensioned so that each side of the V-shaped portion has an equal length with each free marginal edge of the enwrapment comprising an overlapped portion. The two free marginal edges may be abutted and extend outwardly from the package. If one or both of these edges have been provided with an adhesive coating they may be secured together to form a fin type seam which may then be folded against a side of the package. It may be noted that with this form of enwrapment the removal of the piston from the mass and the exiting of the piston from an end portion of the tubular enwrapment may be accomplished in the same manner as described in connection with the forms of enwrapment shown in the drawings. Also, the fin type seam may be made by heat sealing without adversely affecting commodities enclosed by the enwrapment.

It is considered that a principal feature of the present invention is the discovery that the piston or forming member may be cleanly removed from the plastic mass, which may tend to adhere to the face of the piston, and the piston may be exited from a closed tubular enwrapment without damaging the enwrapment. In fact the deformation of the enwrapment facilitates wiping any plastic which may adhere to the piston and as described, such deformation assists in formation of the end folds.

The disposition of the molding cavities around an end face of a rotary member with the support members mounted for sliding movement in a radial direction along the face of the rotary member results in a construction affording great stability of the moving parts. The support members may have an accurate sliding motion closely adjacent to the end face of the pistons when they reach their outward position. It has been found that this relationship creates a shearing effect so that even in the case of materials which are exceptionally adherent, the formed mass is cleanly sheared from the piston and there is very little material clinging to the face of the piston to be wiped onto the end portions of the enwrapment. The clean separation of the mass from the face of the piston and the fact that the arrangement and design of the molding cavity permits adjustment in the direction of the smallest cross sectional area of the mass, results in a more accurate measurement of the mass.

It will be understood that the foregoing description of preferred embodiments of the invention is for the purpose of explanation and illustration and numerous variations and modifications other than those which have meen described may be made without departing from the spirit of the invention.

What I claim is:

1. In apparatus for producing packaged molded masses of plastic material, an enwrapment support having angularly disposed receiving surfaces to which enwrapments may be fed and supported in V-shaped configuration, depositing means for disposing a molded mass of plastic material onto an enwrapment carried by said support member and inwardly of the edges of the enwrapment, means carried by said support for folding the enwrapment around the outside of said mass with edge portions of the enwrapment enclosing said depositing means, and means for moving said support with respect to said depositing means to remove the depositing means laterally through an opening in the end portion of said tubular enwrapment.

2. Apparatus in accordance with claim 1, and including elements for forming end folds of the tubular enwrapment as said depositing means is being withdrawn.

3. Apparatus for producing packaged masses of plastic material, comprising a support having angularly disposed surfaces meeting at a common edge and forming a reentrant V-shaped receiving element adapted to receive an enwrapment having a fold therein registering with the said edge, means for depositing a mass of plastic material molded with angularly disposed surfaces and an edge onto an enwrapment so registered on the support with the edge of the molded material registered with the fold of the enwrapment, means adjacent to the edges of said receiving element for folding the enwrapment around the sides of the molded material and around a portion of said depositing means, and means for moving one of the said support and depositing means with respect to the other thereof to cause the enwrapment to wipe against the depositing means.

4. Apparatus for producing packaged masses of plastic material, comprising a support having angularly disposed surfaces meeting at a common edge and forming a reentrant V-shaped receiving element adapted to receive an enwrapment having a fold therein registering with the said edge, means for depositing a mass of plastic material molded with angularly disposed surfaces and an edge onto an enwrapment so registered on the support with the edge of the molded material registered with the fold of the enwrapment, means adjacent to the edges of said receiving element for folding the enwrapment around the sides of the molded material and around a portion of said depositing means, means for moving one of the said support and depositing means with respect to the other thereof to cause the enwrapment to wipe against the depositing means, and means for folding the enwrapment against the ends of the molded mass.

5. Apparatus for producing packaged masses of plastic material, comprising a support having angularly disposed surfaces meeting at a common edge and forming a reentrant V-shaped receiving element adapted to receive an enwrapment having a fold therein registering with the said edge, means for depositing a mass of plastic material molded with angularly disposed surfaces and an edge onto an enwrapment so registered on the support with the edge of the molded material registered with the fold of the enwrapment and the depositing means overlapping said enwrapment, means adjacent to the edges of said receiving element for folding the enwrapment around the sides of the molded plastic material and around a portion of said depositing means. means for moving the depositing means continuously, means for moving the support synchronously with the depositing means while the said means deposits molded plastic masses on the support and subsequently at a speed different from that of the depositing means to cause enwrapments carried thereby to wipe against the overlapping depositing means.

6. Apparatus for producing packaged masses of plastic material, comprising a rotatable drum having a plurality of molding cavities therein opening at one end of the drum to receive plastic material, the axes of which cavities are parallel with the axis of the drum, each of the cavities having angularly disposed surfaces meeting at a common edge and forming a reentrant V-shaped surface, pistons in the cavities movable parallel to the axis of the drum to eject the plastic material from said cavities, means to rotate the drum continuously, receiving means adjacent one end of the drum formed with V-shaped receiving surfaces adapted to be aligned with the first named surfaces and adapted to receive folded enwrapments thereon with the folds of the enwrapments received in the V-shaped surfaces and overlapping the pistons when the latter are moved to eject the material from the cavities, means adjacent to the edges of said receiving means for folding the enwrapment around the sides of the ejected plastic material and around a portion of a piston adjacent thereto, and means to move the receiving means with respect to the drum.

7. Apparatus for producing packaged masses of plastic material comprising a rotatable drum having a plurality of molding cavities therein opening at one end of the drum to receive plastic material, the axes of which cavities are parallel with the axis of the drum, each of the cavities having angularly disposed surfaces meeting at a common edge and forming a reentrant V-shaped surface, pistons in the cavities movable parallel to the axis of the drum to eject plastic material from said cavities, means to rotate the drum continuously, receiving means adjacent one end of the drum formed with V-shaped receiving surfaces adapted to be aligned with the first named surfaces and adapted to receive folded enwrapments thereon with the folds of the enwrapments received in the V-shaped surfaces, said pistons being movable to deposit said plastic material onto said enwrapments and into a position overlapping the latter, means adjacent to the edges of the receiving means for folding the enwrapment around the sides of the plastic material deposited on the enwrapment and around a portion of a piston adjacent thereto, and means to move the receiving means in a plane at right angles with respect to the axis of the drum to wipe said enwrapments across said piston.

8. Apparatus for producing packaged masses of plastic material, comprising a rotatable drum having a plurality of molded cavities therein opening at one end of the drum to receive plastic material, the axes of which cavities are parallel with the axis of the drum, each of the cavities having angularly disposed surfaces meeting at a common edge and forming a reentrant V-shaped surface, pistons in the cavities movable parallel to the axis of the drum to eject plastic material from said cavities, means to rotate the drum continuously, receiving means adjacent one end of the drum formed with V-shaped receiving surfaces adapted to be aligned with the first named surfaces and adapted to receive folded enwrapments thereon with the folds of the enwrapments received in the V-shaped surfaces, means to move the receiving means in a plane at right angles with respect to the axis of the drum synchronously with the movement of the drum, means to actuate a piston of the drum to deposit a molded plastic mass on the receiving means while the latter is moving synchronously with respect to the drum and move the piston into a position overlapping an edge of an enwrapment on said receiving means, means adjacent to the receiving means for folding the enwrapment around the sides of the molded plastic mass and around a portion of a piston adjacent thereto, and means to move the receiving means at a speed different from that of the drum after the mass has been deposited thereon whereby enwrapments on the receiving means will be wiped across the face of the piston of the drum.

9. Apparatus for producing packaged masses of plastic material, comprising a rotatable drum having a plurality of molding cavities thereon opening at one end of the drum, the axes of which cavities are parallel with the axis of the drum, each of the cavities having angularly disposed surfaces meeting at a common edge and forming a reentrant V-shaped surface, pistons in the cavities movable parallel to the axis of the drum, means to rotate the drum continuously, receiving means adjacent one end of the drum formed with V-shaped receiving surfaces adapted to be aligned with the first named surfaces and adapted to receive folded enwrapments thereon with the folds of the enwrapments received in the V-shaped surfaces, means to move the receiving means in a plane at right angles with respect to the axis of the drum synchronously with the movement of the drum, means to actuate a piston of the drum to deposit a molded plastic mass on the receiving means while the latter is moving synchronously with respect to the drum and move the piston into a position overlapping an edge of an enwrapment on said receiving means, means adjacent to the receiving means for folding the enwrapment around the sides of the molded mass and around a portion of a piston adjacent thereto, means to move the receiving means at a speed different from that of the drum after the mass has been deposited thereon whereby enwrapments on the receiving means will be wiped across the face of the piston of the drum, and means to fold the enwrapment about the plastic mass while the latter is on the receiving means.

(References on following page)

References Cited in the file of this patent

UNITED STATES PATENTS

| | | | |
|---|---|---|---|
| 49,376 | Capron | Aug. 15, | 1865 |
| 65,931 | Mills | June 18, | 1867 |
| 230,778 | Howe | Aug. 3, | 1880 |
| 692,903 | Rainbow | Feb. 11, | 1902 |
| 715,739 | Armstrong | Dec. 16, | 1902 |
| 1,108,696 | Casey | Aug. 25, | 1914 |
| 1,545,513 | Peters | July 14, | 1925 |
| 1,626,860 | Mudd | May 3, | 1927 |
| 1,706,534 | Malone | Mar. 26, | 1929 |
| 1,825,058 | Goldstein | Sept. 29, | 1931 |
| 1,955,331 | Howard et al. | Apr. 17, | 1934 |
| 2,089,273 | Lakso | Aug. 10, | 1937 |
| 2,193,140 | Mortenson | Mar. 12, | 1940 |
| 2,370,920 | Schaub | Mar. 6, | 1945 |
| 2,451,301 | O'Connell | Oct. 12, | 1948 |
| 2,468,695 | Wallace | Apr. 26, | 1949 |
| 2,500,922 | Berch | Mar. 21, | 1950 |

FOREIGN PATENTS

| | | | |
|---|---|---|---|
| 25,298 | Great Britain | Nov. 9, | 1906 |
| 501,568 | Germany | July 5, | 1930 |
| 606,993 | Great Britain | Aug. 24, | 1948 |